(12) United States Patent
Murphy et al.

(10) Patent No.: US 10,902,249 B2
(45) Date of Patent: Jan. 26, 2021

(54) VIDEO MONITORING

(71) Applicant: Hewlett-Packard Development Company, L.P., Spring, TX (US)

(72) Inventors: David Murphy, Palo Alto, CA (US); Thiago Jose Da Silva, Porto Alegre (BR); Qian Lin, Palo Alto, CA (US); Madhu Athreya, Palo Alto, CA (US); Caio Northfleet, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,931

(22) PCT Filed: Oct. 31, 2016

(86) PCT No.: PCT/US2016/059778
§ 371 (c)(1),
(2) Date: Mar. 22, 2019

(87) PCT Pub. No.: WO2018/080547
PCT Pub. Date: May 3, 2018

(65) Prior Publication Data
US 2019/0311192 A1    Oct. 10, 2019

(51) Int. Cl.
*G06K 9/00*  (2006.01)
*G06T 7/215*  (2017.01)
(Continued)

(52) U.S. Cl.
CPC ..... *G06K 9/00369* (2013.01); *G06K 9/00288* (2013.01); *G06K 9/00744* (2013.01);
(Continued)

(58) Field of Classification Search
CPC .......... G06K 9/00369; G06K 9/00288; G06K 9/00744; G06K 9/00771; G06K 9/00201;
(Continued)

(56) References Cited

U.S. PATENT DOCUMENTS 7,136,507 B2   11/2006  Han et al.
8,254,633 B1   8/2012   Moon et al.
(Continued)

FOREIGN PATENT DOCUMENTS

CN           204166598 U       2/2015

*Primary Examiner* — Thai Q Tran
*Assistant Examiner* — Sungyoun Park
(74) *Attorney, Agent, or Firm* — Dicke Billig & Czaja PLLC

(57) ABSTRACT

One example of a video monitoring system includes a frame acquisition subsystem, a stage gate motion detection subsystem, a person detection subsystem, a face recognition subsystem, and an alert emission subsystem. The frame acquisition subsystem extracts frames from an input video. The stage gate motion detection subsystem separates background motion from foreground motion within frames. The person detection subsystem detects people including faces and bodies within the foreground motion. The face recognition subsystem matches detected faces to previously registered users. The alert emission subsystem provides alerts based on events detected by the stage gate motion subsystem, the person detection subsystem, and the face recognition subsystem.

18 Claims, 5 Drawing Sheets

(51) Int. Cl.
  *G08B 13/196* (2006.01)
  *H04N 7/18* (2006.01)
  *G08B 25/08* (2006.01)
  *G06K 9/32* (2006.01)
  *H04N 5/14* (2006.01)

(52) U.S. Cl.
  CPC .......... *G06K 9/00771* (2013.01); *G06T 7/215* (2017.01); *G08B 13/19608* (2013.01); *G08B 13/19613* (2013.01); *G08B 25/08* (2013.01); *H04N 7/18* (2013.01); *G06K 9/00201* (2013.01); *G06K 9/3233* (2013.01); *H04N 5/144* (2013.01)

(58) Field of Classification Search
  CPC  G06K 9/3233; G06T 7/215; G08B 13/19608; G08B 13/19613; G08B 25/08; H04N 7/18; H04N 5/144
  See application file for complete search history.

(56) References Cited

U.S. PATENT DOCUMENTS

| | | | |
|---|---|---|---|
| 8,471,910 B2 | 6/2013 | Cleary et al. | |
| 8,605,945 B2 | 12/2013 | El-Maleh et al. | |
| 2001/0048753 A1* | 12/2001 | Lee | G06T 7/155 382/103 |
| 2002/0191817 A1* | 12/2002 | Sato | G07C 9/00158 382/118 |
| 2003/0058111 A1* | 3/2003 | Lee | G08B 21/0423 340/573.1 |
| 2006/0170769 A1* | 8/2006 | Zhou | G06K 9/00362 348/143 |
| 2006/0215880 A1 | 9/2006 | Berthilsson et al. | |
| 2007/0061022 A1* | 3/2007 | Hoffberg-Borghesani | H04N 5/44582 700/83 |
| 2007/0175406 A1 | 8/2007 | Liang et al. | |
| 2007/0182540 A1 | 8/2007 | Marman | |
| 2008/0107341 A1* | 5/2008 | Lu | G06K 9/00248 382/190 |
| 2009/0315996 A1 | 12/2009 | Guler et al. | |
| 2010/0157049 A1* | 6/2010 | Dvir | G08B 13/19608 348/143 |
| 2011/0242277 A1* | 10/2011 | Do | G06T 5/002 348/43 |
| 2012/0025989 A1* | 2/2012 | Cuddihy | G06T 7/74 340/573.1 |
| 2013/0182114 A1 | 7/2013 | Zhang et al. | |
| 2014/0028842 A1* | 1/2014 | Abramson | G06K 9/00785 348/143 |
| 2015/0147049 A1* | 5/2015 | Eronen | H04N 5/265 386/285 |
| 2015/0235379 A1* | 8/2015 | O'Gorman | H04N 5/147 382/103 |
| 2017/0041503 A1* | 2/2017 | Nobutani | G06K 9/00255 |

\* cited by examiner

VIDEO MONITORING

BACKGROUND

There is an increasing desire among consumers to monitor their homes and/or businesses with Internet of Things (IoT) cameras. The monitoring may be used for security purposes, to keep track of designated individuals (e.g., to know if children arrived home), or for other purposes.

DETAILED DESCRIPTION

Figure 1A:
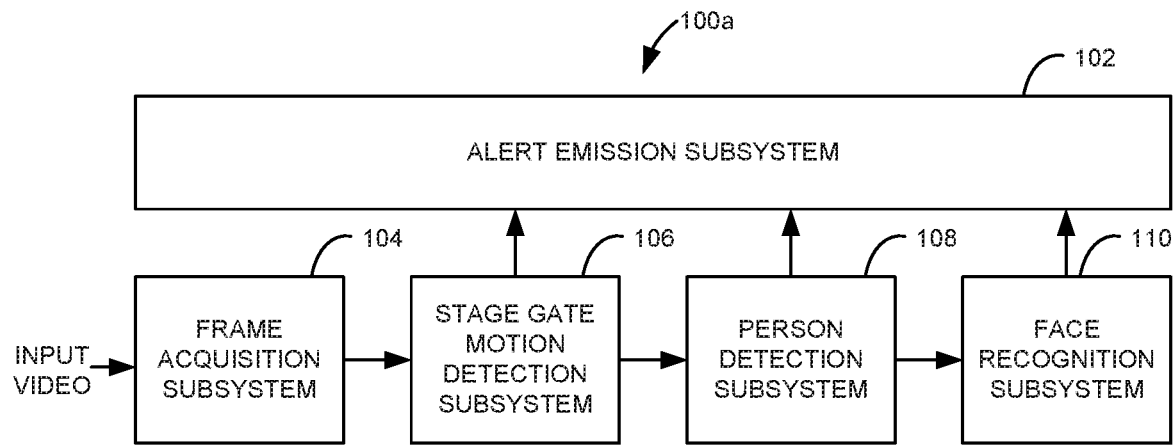
FIG. 1A is a functional block diagram illustrating one example of a pipeline monitoring system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Consumers desire a good user experience when using Internet of Things (IoT) camera monitoring systems including high quality notifications. Consumers want to be notified only when a real person is detected rather than when there is motion detected due to trees swaying in the breeze outside a window or other non-relevant motion. Providing such a service with high quality alerts is challenging in certain environments (e.g., in a home environment). Illumination may be poor due to low light, extreme backlight or sidelight, and/or a low resolution camera. The camera may also have a very wide-angle lens, sometimes with a 360 degree field of view lens, resulting in significant distortion and further loss in resolution. The subjects themselves may be far from the camera, may not face the camera, or may be fully or partially blocked from view. Some IoT cameras are low-power battery operated cameras to enable the cameras to be flexibly deployed around the environment to be monitored. Computer vision processes are complex in terms of computation, which makes the processes unsuitable for low-power architectures. The more complex the processes become, the more power used to implement the processes.

Some IoT cameras used in homes are aided only with simple motion detectors, and hence are unable to filter out unimportant events from important events, and the users may be inundated with many alerts that are not useful. The user is also prone to miss the really important events as all alerts are similar. Although some IoT cameras can detect faces and attempt to raise slightly higher quality alerts, the approach is very inaccurate, and frequently does not detect a person due to the inherent challenges of the environment being monitored.

Accordingly, described herein is a real-time video monitoring system and method to intelligently track and raise alerts from a camera (e.g., IoT camera) video stream in a challenging environment (e.g., home environment). The monitoring system tracks objects (e.g., people) and movement occurring within the cameras' field of view and automatically reports to the users about the events they care about (e.g., unknown people, unexpected objects, and suspicious movement, etc.). The system also includes a fully integrated user interface to provide rich alert browsing as well as in depth system management.

FIG. 1A is a functional block diagram illustrating one example of a pipeline monitoring system 100a. Pipeline monitoring system 100a includes an alert emission subsystem 102, a fame acquisition subsystem 104, a stage gate motion detection subsystem 106, a person detection subsystem 108, and a face recognition subsystem 110. In one example, pipeline monitoring system 100a is implemented by a processor and a machine-readable storage medium such as processor 602 and machine-readable storage medium 606, which will be described with reference to FIG. 6.

Frame acquisition subsystem 104 receives an input video and extracts frames from the input video to provide the video frames to stage gate motion detection subsystem 106. In one example, the input video is provided by an IoT camera. Frame acquisition subsystem 104 will be further described below with reference to FIG. 3. Stage gate motion detection subsystem 106 receives video frames from frame acquisition subsystem 104 and separates background motion from foreground motion within the frames to provide the foreground motion to person detection subsystem 108. Stage gate motion detection subsystem 106 will be further described below with reference to FIG. 4.

Person detection subsystem 108 receives the foreground motion from stage gate motion detection subsystem 106 and detects people including faces and bodies within the foreground motion to provide to face recognition subsystem 110. Person detection subsystem 108 will be further described below with reference to FIG. 5. Face recognition subsystem 110 receives the detected people including faces and bodies and matches detected faces to previously registered users. Face recognition subsystem 110 may recognize one or multiple faces within a frame and provide annotations informing which known person(s) is in the frame and where they are within the frame. In one example, pipeline monitoring system 100a also provides advanced search and filtering capabilities based on face recognition.

Alert emission subsystem 102 provides alerts based on events detected by stage gate motion subsystem 106 (e.g., motion detected events), person detection subsystem 108 (e.g., person detected events), and face recognition subsystem 110 (e.g., face recognized events). Alerts are emitted based on events detected throughout the system pipeline. Alert emission subsystem 102 may store alerts in a database (e.g., database 112 of FIG. 1B) and also issue the alerts on a user's device and/or on a system user interface. In addition, alert emission subsystem 102 handles browsing and history management of the alerts so that previous alerts may be searched and viewed by users. An alert may include a portion of video (i.e., a notification video) within which events were detected. The notification video may include annotations including date, time, detected persons, recognized faces, or other information about the detected events.

Figure 1B:
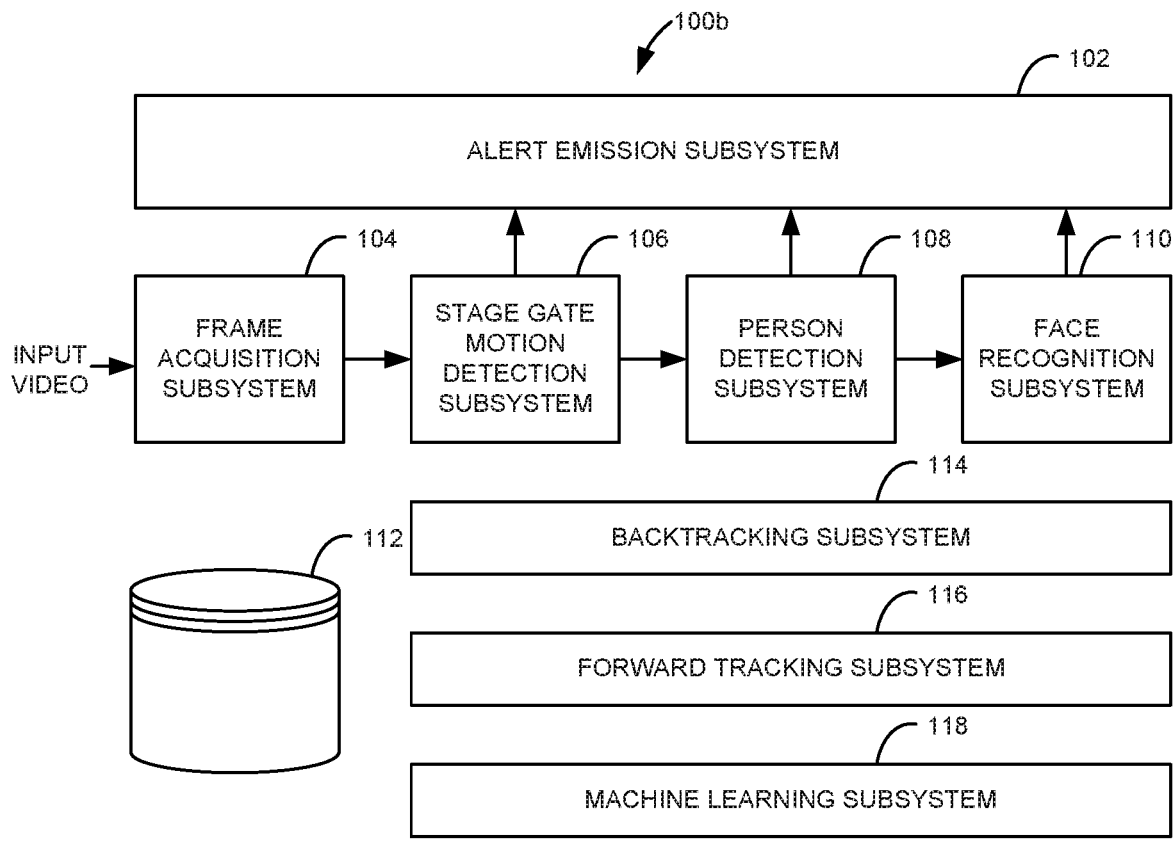
FIG. 1B is a functional block diagram illustrating another example of a pipeline monitoring system.

FIG. 1B is a functional block diagram illustrating another example of a pipeline monitoring system 100b. Pipeline monitoring system 100b is similar to pipeline monitoring system 100a previously described and illustrated with reference to FIG. 1A, except that pipeline monitoring system 100b also includes a database 112, a backtracking subsystem 114, a forward tracking subsystem 116, and a machine learning subsystem 118 in addition to previously described alert emission subsystem 102, fame acquisition subsystem 104, stage gate motion detection subsystem 106, person detection subsystem 108, and face recognition subsystem 110. In one example, pipeline monitoring system 100b is implemented by a processor and a machine-readable storage medium such as processor 602 and machine-readable storage medium 606, which will be described with reference to FIG. 6.

Database 112 stores frames extracted from the input video by frame acquisition subsystem 104. In one example, database 112 also stores the input video provided to frame acquisition subsystem 104. Database 112 also stores annotated frames based on information received from stage gate motion detection subsystem 106, person detection subsystem 108, face recognition subsystem 110, backtracking subsystem 114, and forward tracking subsystem 116. Database 112 is sized to store a desired number of hours of input video and/or frames. Once database 112 is full, the oldest input video and/or frames may be overwritten with new input video and/or frames. The database engine used for database 112 may be exchangeable, and a set of possible database engines may be made available for selection by a user.

Backtracking subsystem 116 revisits previous frames in response to detecting a person to track the detected person within the previous frames. Frequently, subjects in the field of view of the camera are either far away or not facing the camera. The subjects may also be partially or fully blocked in the field of view. In these cases, computer vision systems typically fail. As the subject moves, however, at future instances in time, the subject may appear closer to the camera with a frontal view. At this point, the person is detected and recognized. Having recognized the person, backtracking subsystem 116 revisits past frames and annotates them. In one example, frame to frame motion analysis and tracking is used to accomplish the backtracking. The backtracking may also be used to correct detection errors. For example, if the identification of a subject in a current frame with a better view differs from the identification of the subject in a previous frame with a poorer view, the identification of the subject may be corrected for the previous frame.

Forward tracking subsystem 116 tracks a detected person in subsequent frames without detecting the person within each subsequent frame. Forward tracking is implemented in parallel with backtracking to further improve person detection subsystem 108 and to reduce computation time. Forward tracking may be used to efficiently track a person throughout a notification video without requiring person detection in each frame. This makes it possible to estimate a person's location in future frames based on a single detection.

Machine learning subsystem 118 improves the accuracy over time of stage gate motion subsystem 106, person detection subsystem 108, and face recognition subsystem 110 in response to detected errors within stage gate motion subsystem 106, person detection subsystem 108, and face recognition subsystem 110 being rectified by backtracking subsystem 114. When false positives or false negatives are rectified by backtracking subsystem 114, machine learning subsystem 118 is trained to improve accuracy over time.

Figure 2:
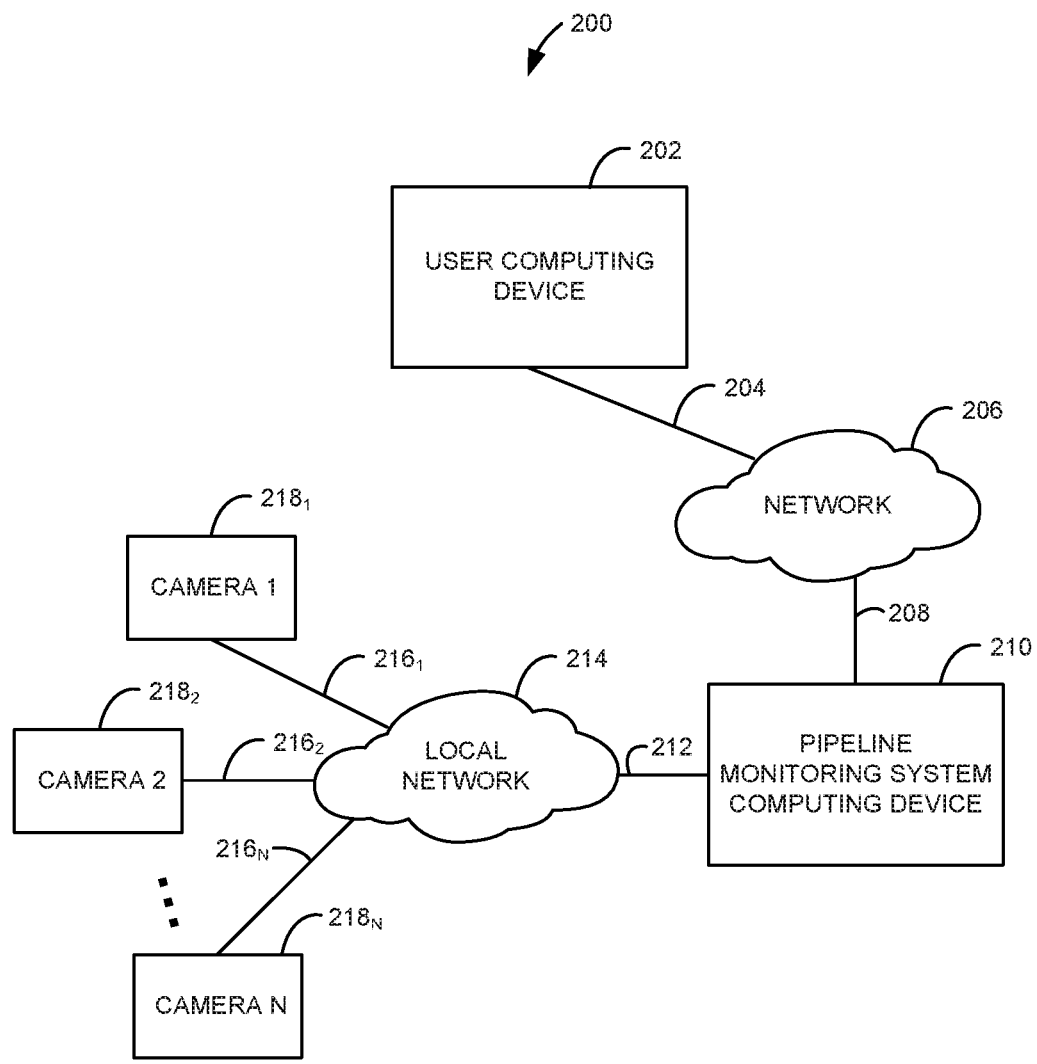
FIG. 2 is a block diagram illustrating one example of a camera based monitoring system.

FIG. 2 is a block diagram illustrating one example of a camera based monitoring system 200. Camera based monitoring system 200 includes a user computing device 202, a network 206, a pipeline monitoring system computing device 210, a local network 214, and cameras $218_1$ through $218_N$, where "N" is any suitable number of cameras. User computing device 202 is communicatively coupled to network 206 through a communication path 204. Pipeline monitoring system computing device 210 is communicatively coupled to network 206 through a communication path 208 and to local network 214 through a communication path 212. Each camera $218_1$ through $218_N$ is communicatively coupled to local network 214 via a communication path $216_1$ through $216_N$, respectively. Network 206 may be a local-area network (LAN), a wide-area network (WAN), the Internet, or another suitable network. Local network 214 may include a wired and/or wireless network. Communication paths 204, 208, 212, and $216_1$ through $216_N$ may include wired and/or wireless communication links.

Pipeline monitoring system computing device 210 implements pipeline monitoring system 100a or 100b previously described and illustrated with reference to FIGS. 1A and 1B, respectively. Pipeline monitoring system computing device 210 receives a video feed from each camera $218_1$ through $218_N$ through local network 214. In one example, each camera $218_1$ through $218_N$ is an IoT camera. Pipeline monitoring system computing device 210 communicates with user computing device 202 through network 206 to provide alerts to user computing device 202. Pipeline monitoring system computing device 210 may also be configured by user computing device 202 and respond to queries from user computing device 202.

User computing device 202 may be any suitable computing device for communicating with pipeline monitoring system computing device 210, such as, for example, a laptop or desktop computer, a tablet, or a smartphone. User computing device 202 implements a user interface for a user to interact with pipeline monitoring system computing device 210. In one example, user computing device 202 is communicatively coupled to local network 214 rather than network 206 for communicating with pipeline monitoring system computing device 210.

Figure 3:
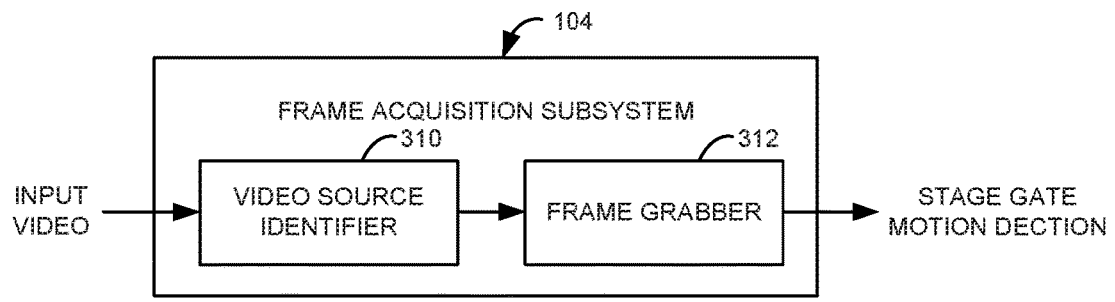
FIG. 3 is a functional block diagram illustrating one example of a frame acquisition subsystem.

FIG. 3 is a functional block diagram illustrating one example of a frame acquisition subsystem 104. Frame acquisition subsystem 104 includes a video source identifier 310 and a frame grabber 312. Video source identifier 310 receives an input video and identifies a user-defined video source and provides ways to extract each image (i.e., frame) from the input video. When handling the streaming source such as an IoT camera, frames are read in a rate dependent upon the full pipeline monitoring system processing cycle time. Accordingly, frames may be skipped during runtime.

Frame grabber 312 retrieves each frame read by video source 310 and passes the frame into the pipeline of the monitoring system (i.e., to stage gate motion detection subsystem 106). Frame grabber 312 also stores the frame and other contextual data (e.g., date, time, location) in the database (e.g., database 112 of FIG. 1B).

Figure 4:
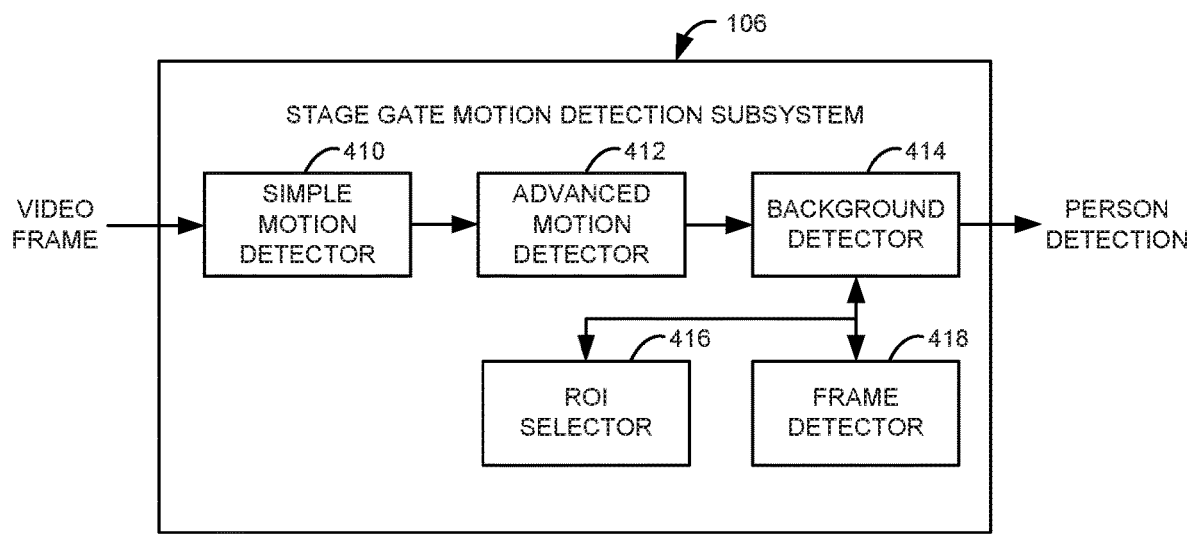
FIG. 4 is a functional block diagram illustrating one example of a stage gate motion detection subsystem.

FIG. 4 is a functional block diagram illustrating one example of a stage gate motion detection subsystem 106. Stage gate motion detection subsystem 106 includes a simple motion detector 410, an advanced motion detector 412, a background detector 414, a region of interest (ROI) selector 416, and a frame detector 418.

Simple motion detector 410 looks for coarse motion within frames using minimal processing, and hence consuming low power. Simple motion detector 410 considers that whenever a pixel changes its intensity value above a predefined threshold, this indicates a possible movement between frames. Advanced motion detector 412 is enabled whenever any course motion is detected by simple motion detector 410. This more advanced motion detector uses proportionally more computational power to detect both frame foreground motion and/or frame background motion. In response to advanced motion detector 412 detecting advanced motion, background detector 414 is enabled.

Background detector 414 separates the frame foreground motion from the frame background motion. This makes it possible to distinguish relevant foreground motion from non-relevant background motion. Background detector 414 uses ROI selector 416 and frame detector 418. Frames may be detected by frame detector 418 and ROIs may be selected by ROI selector 416. ROIs may be selected by users to eliminate motion seen in a window or due to a television. In these cases, motion analysis is restricted to specific areas of the video frames. If motion is detected after suppressing all non-relevant sources, then person detection subsystem 108 is enabled, which uses even more computational power.

Figure 5:
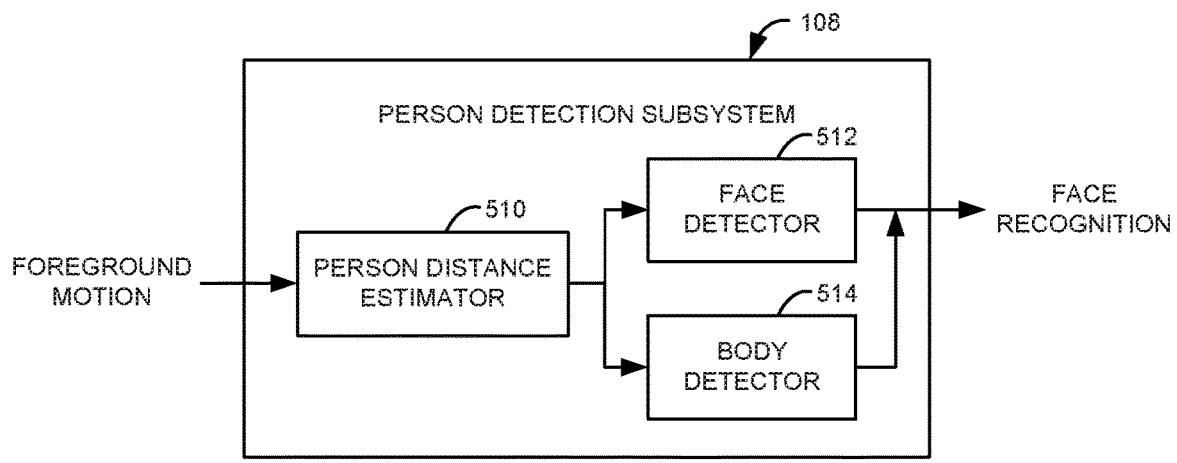
FIG. 5 is a functional block diagram illustrating one example of a person detection subsystem.

FIG. 5 is a functional block diagram illustrating one example of a person detection subsystem 108. Person detection subsystem 108 includes a person distance estimator 510, a face detector 512, and a body detector 514. Person detection is a combination of face detection and body detection. This approach overcomes resolution challenges and subject distance. If the subject is close to the camera, then there is sufficient spatial resolution to detect a face. If the subject is further away from the camera, extra processing may be used. When a face is detected, the face recognition subsystem 110 is enabled.

Person distance estimator 510 estimates the distance between the camera and the subject. The estimation may be performed by computer vision methods or by a three-dimensional (3D) depth estimation camera. Person distance estimator 510 determines whether the face detector 512 and/or the body detector 514 will be enabled. In response to person distance estimator 510 determining that the subject is within a threshold distance from the camera, person distance estimator 510 enables face detector 512. In response to person distance estimator 510 determining that the subject is outside a threshold distance from the camera, person distance estimator 510 enables body detector 514.

Body detector 514 divides the frames into sub regions and sweeps the sub regions looking for patterns that ultimately resemble bodies. A histogram of oriented gradient may be used to build a normalized descriptor for each sub region. These descriptors may be used as support vector machine (SVM) classifier inputs to determine if the frame contains bodies. Face detector 512 works in parallel to body detector 514 to find faces on frames. Face detector 512 may use a Haar feature-based cascade classifier for object detection trained to recognize faces. When faces are identified through the frame, their attributes are annotated to be used with face recognition subsystem 110.

Figure 6:
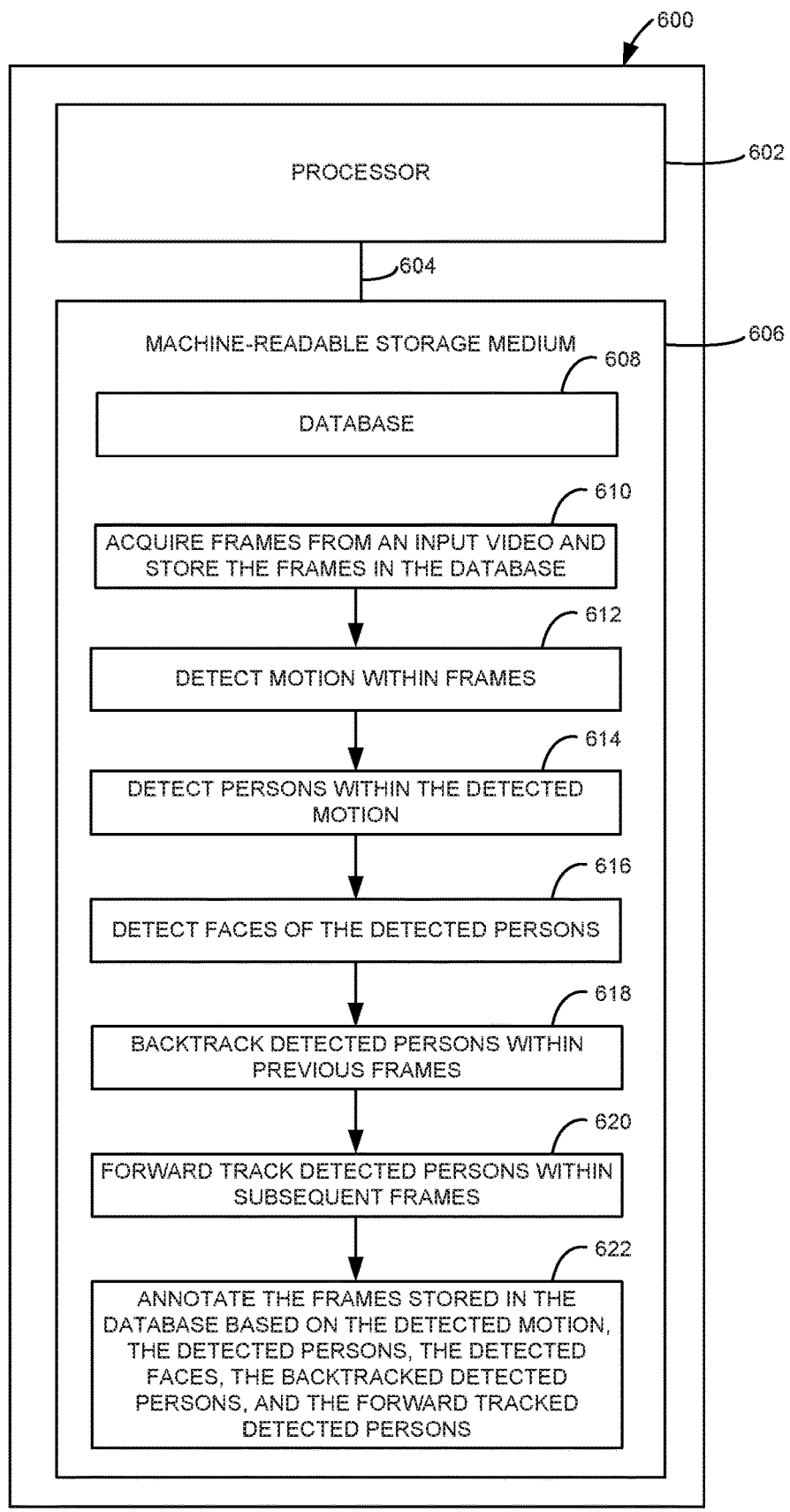
FIG. 6 is a block diagram illustrating one example of a processing system for a pipeline monitoring system.

FIG. 6 is a block diagram illustrating one example of a processing system 600 for a pipeline monitoring system. System 600 includes a processor 602 and a machine-readable storage medium 606. Processor 602 is communicatively coupled to machine-readable storage medium 606 through a communication path 604. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 602 includes one or more central processing units (CPUs), microprocessors, and/or other suitable hardware devices for retrieval and execution of instructions stored in machine-readable storage medium 606. Machine-readable storage medium 606 may store a database 608. Processor 602 may fetch, decode, and execute instructions 610-622 to implement a pipeline monitoring system.

Processor 602 may fetch, decode, and execute instructions 610 to acquire frames from an input video and store the frames in database 608. Processor 602 may fetch, decode, and execute instructions 612 to detect motion within frames. In one example, processor 602 executes instructions 612 to detect simple motion within frames, detect advanced motion within frames in response to detecting simple motion, and separate relevant foreground motion from non-relevant background motion in response to detecting advanced motion. Separating relevant foreground motion from non-relevant background motion in response to detecting advanced motion may include detecting relevant foreground motion based on user defined regions of interest within frames.

Processor 602 may fetch, decode, and execute instructions 614 to detect persons within the detected motion. Processor 602 may fetch, decode, and execute instructions 616 to detect faces of the detected persons. Processor 602 may fetch, decode, and execute instructions 618 to backtrack detected persons within previous frames. Processor 602 may fetch, decode, and execute instructions 620 to forward track detected persons within subsequent frames. Processor 602 may fetch, decode, and execute instructions 622 to annotate the frames stored in database 608 based on the detected motion, the detected persons, the detected faces, the back-tracked detected persons, and the forward tracked detected persons.

In one example, processor 602 executes further instructions to improve the person detection accuracy and the face detection accuracy over time in response to the backtracking rectifying errors within the person detection and face detection. In another example, processor 602 executes further instructions to generate alerts based on detected motion, detected persons, and detected faces; store the alerts in database 608; and transmit the alerts to a user computing device.

As an alternative or in addition to retrieving and executing instructions, processor 602 may include one or more electronic circuits comprising a number of electronic components for performing the functionality of one or more of the instructions in machine-readable storage medium 606. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 606 is a non-transitory storage medium and may be any suitable electronic, magnetic, optical, or other physical storage device that stores executable instructions. Thus, machine-readable storage medium 606 may be, for example, random access memory (RAM), an electrically-erasable programmable read-only memory (EEPROM), a storage drive, an optical disc, and the like. Machine-readable storage medium 606 may be disposed within system 600, as illustrated in FIG. 6. In this case, the executable instructions may be installed on system 600. Alternatively, machine-readable storage medium 606 may be a portable, external, or remote storage medium that allows system 600 to download the instructions from the portable/external/remote storage medium. In this case, the executable instructions may be part of an installation package.

Figure 7:
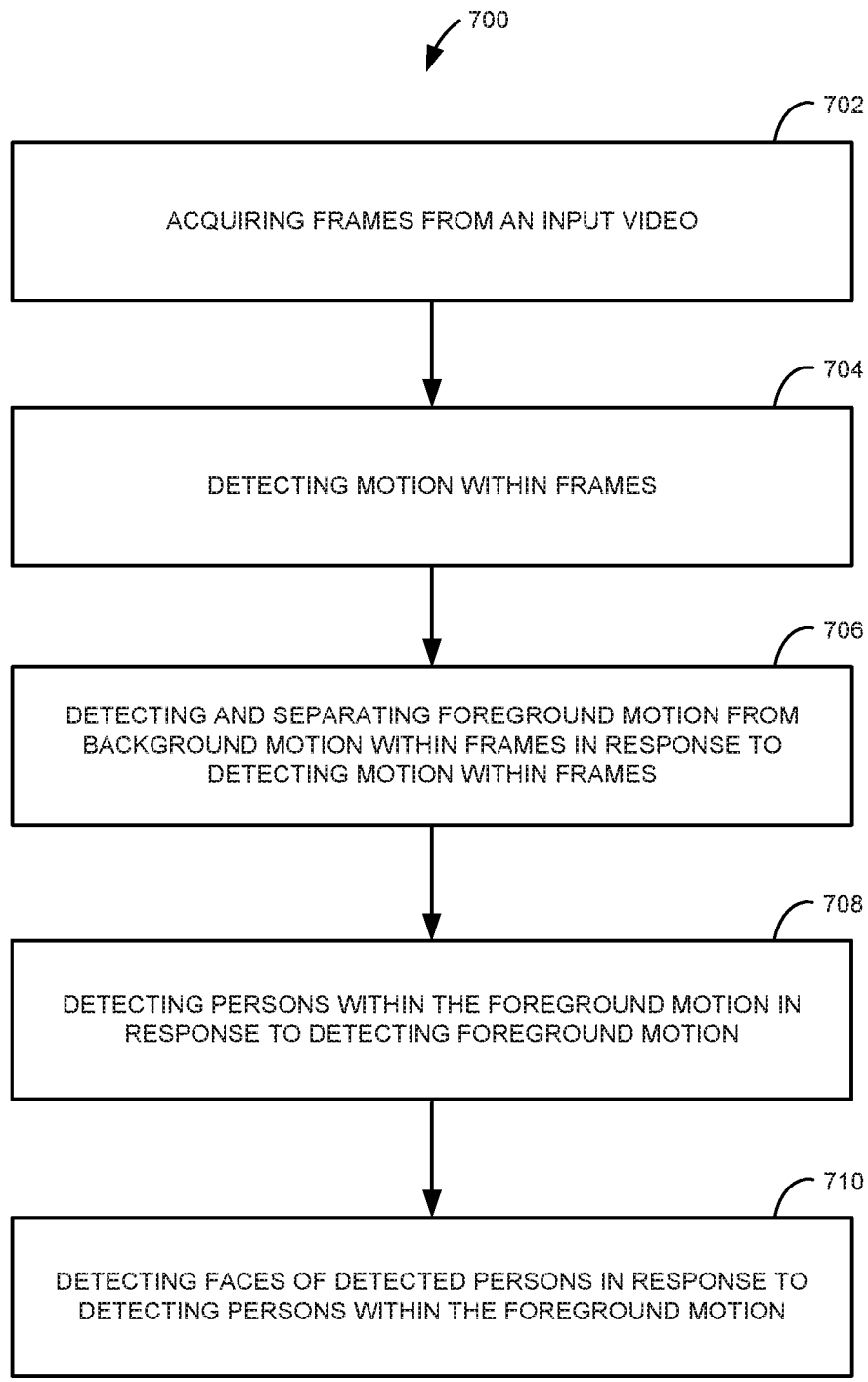
FIG. 7 is a flow diagram illustrating one example of a method for monitoring video.

FIG. 7 is a flow diagram illustrating one example of a method 700 for monitoring video. At 702, method 700 includes acquiring frames from an input video. At 704, method 700 includes detecting motion within frames. At 706, method 700 includes detecting and separating foreground motion from background motion within frames in response to detecting motion within frames. At 708, method 700 includes detecting persons within the foreground motion in response to detecting foreground motion. At 710, method 700 includes detecting faces of detected persons in response to detecting persons within the foreground motion.

In one example, method 700 also includes backtracking via frame to frame motion analysis and tracking to revisit previous frames to annotate the previous frames in response to detecting a person within the foreground motion. Method 700 may also include improving the accuracy of detected persons and detected faces in response to rectifying detection errors via the backtracking. In another example, method 700 includes forward tracking a detected person in subsequent frames without redetecting the person in each subsequent frame. Method 700 may also include alerting a user in response to detecting a person.

The pipeline monitoring system disclosed herein raises high quality alerts with intelligent motion detection, person detection, and face recognition. The accuracy of the system is improved over time with machine learning. The system is power efficient due to the stage gate motion detection and switching between face and body detection. The system is able to execute automatically using few direct user interactions and thus is able to run on its own for extended periods of time. In addition, the system provides rich browsing capabilities and powerful history features to aid users in keeping track of the alerts generated by the monitoring system.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A video monitoring system comprising:
a frame acquisition subsystem to extract frames from an input video;
a stage gate motion detection subsystem to separate background motion from foreground motion within frames;
a person detection subsystem to detect people including faces and bodies within the foreground motion;
a face recognition subsystem to match detected faces to previously registered users;
an alert emission subsystem to provide alerts based on events detected by the stage gate motion subsystem, the person detection subsystem, and the face recognition subsystem; and
a backtracking subsystem to revisit previous frames in response to detecting a person to track the detected person within the previous frames and to correct an identification of a person in a previous frame with a poorer view of the person in response to a different identification of the person in a current frame with a better view of the person than the previous frame.

2. The video monitoring system of claim 1, further comprising:
a forward tracking subsystem to track a detected person in subsequent frames without detecting the person within each subsequent frame.

3. The video monitoring system of claim 2, further comprising:
a machine learning subsystem to improve accuracy over time of the stage gate motion subsystem, the person detection subsystem, and the face recognition subsystem in response to detected errors within the stage gate motion subsystem, the person detection subsystem, and the face recognition subsystem being rectified by the backtracking subsystem.

4. The video monitoring system of claim 1, wherein the stage gate motion detection subsystem comprises:
a simple motion detector to detect course motion within frames;
an advanced motion detector to detect advanced motion within frames in response to detecting course motion; and
a background subtractor to distinguish relevant foreground motion from non-relevant background motion within the detected advanced motion.

5. The video monitoring system of claim 1, wherein the person detection subsystem comprises:
a person distance estimator to determine whether a person may be detected within a frame;
a body detector to detect bodies within the frame in response to the person distance estimator indicating a person may be detected within the frame; and
a face detector to detect faces within the frame in response to the person distance estimator indicating a person may be detected within the frame.

6. The video monitoring system of claim 1, further comprising:
a database to store annotated frames based on information received from the stage gate motion detection subsystem, the person detection subsystem, and the face recognition subsystem.

7. A video monitoring system comprising:
a machine-readable storage medium storing a database and instructions; and
a processor to execute the instructions to:
acquire frames from an input video and store the frames in the database;
detect motion within frames;
detect persons within the detected motion;
detect faces of the detected persons;
backtrack detected persons within previous frames and correct an identification of a person in a previous frame with a poorer view of the person in response to a different identification of the person in a current frame with a better view of the person than the previous frame;

forward track detected persons within subsequent frames; and annotate the frames stored in the database based on the detected motion, the detected persons, the detected faces, the backtracked detected persons, and the forward tracked detected persons.

8. The video monitoring system of claim 7, wherein the processor is to execute the instructions to further:

improve the person detection accuracy and the face detection accuracy over time in response to the backtracking rectifying errors within the person detection and face detection.

9. The video monitoring system of claim 7, wherein the processor is to execute the instructions to further:

generate alerts based on detected motion, detected persons, and detected faces;

store the alerts in the database; and transmit the alerts to a user computing device.

10. The video monitoring system of claim 7, wherein the instructions to detect motion within frames comprises instructions to:

detect simple motion within frames;

detect advanced motion within frames in response to detecting simple motion; and separate relevant foreground motion from non-relevant background motion in response to detecting advanced motion.

11. The video monitoring system of claim 10, wherein the instructions to separate relevant foreground motion from non-relevant background motion in response to detecting advanced motion comprises instructions to:

detect relevant foreground motion based on user defined regions of interest within frames.

12. The video monitoring system of claim 7, wherein the instructions to detect persons within the detected motion comprises instructions to:

estimate a distance between a subject and a camera providing the input video to determine whether a person may be detected within a frame.

13. The video monitoring system of claim 7, wherein the user defined regions of interest are selected to eliminate detecting motion seen in a window or a television within the frames.

14. A method to monitor video, the method comprising:

acquiring frames from an input video;

detecting motion within frames;

detecting and separating foreground motion from background motion within frames in response to detecting motion within frames;

detecting persons within the foreground motion in response to detecting foreground motion;

detecting faces of detected persons in response to detecting persons within the foreground motion;

backtracking via frame to frame motion analysis and tracking to revisit previous frames to annotate the previous frames in response to detecting a person within the foreground motion; and improving the accuracy of detected persons and detected faces in response to rectifying detection errors in previous frames via the backtracking, wherein rectifying detection errors comprises correcting an identification of a person in a previous frame with a poorer view of the person in response to a different identification of the person in a current frame with a better view of the person than the previous frame.

15. The method of claim 14, further comprising:

forward tracking a detected person in subsequent frames without redetecting the person in each subsequent frame.

16. The method of claim 14, further comprising:

alerting a user in response to detecting a person.

17. The method of claim 14, wherein detecting persons within the foreground motion in response to detecting foreground motion comprises estimating a distance between a subject and a camera providing the input video to determine whether a person may be detected within a frame.

18. The method of claim 14, further comprising:

annotating the frames based on the detected motion, the detected persons, and the detected faces; and storing the annotated frames in a database.

* * * * *